April 27, 1965 P. KOLLSMAN 3,180,814
METHOD OF PRODUCING AN ION EXCHANGE MEMBRANE
OF HIGH ELECTRICAL CONDUCTIVITY
Filed Sept. 9, 1960 5 Sheets-Sheet 1

INVENTOR.
Paul Kollsman

April 27, 1965

P. KOLLSMAN 3,180,814

METHOD OF PRODUCING AN ION EXCHANGE MEMBRANE
OF HIGH ELECTRICAL CONDUCTIVITY

Filed Sept. 9, 1960

INVENTOR.
Paul Kollsman

April 27, 1965 P. KOLLSMAN 3,180,814
METHOD OF PRODUCING AN ION EXCHANGE MEMBRANE
OF HIGH ELECTRICAL CONDUCTIVITY
Filed Sept. 9, 1960 5 Sheets-Sheet 3

INVENTOR.
Paul Kollsman

INVENTOR.
Paul Kollsman

INVENTOR.
Paul Kollsman 3,180,814
METHOD OF PRODUCING AN ION EXCHANGE MEMBRANE OF HIGH ELECTRICAL CONDUCTIVITY
Paul Kollsman, 100 E. 50th St., New York, N.Y.
Filed Sept. 9, 1960, Ser. No. 54,936
25 Claims. (Cl. 204—131)

Ion exchange membranes composed of synthetic resin offer a certain resistance to an electric current passing through the membrane. Normally, ion exchange membranes of high selectivity also have a relatively high electrical resistivity, and in many practical uses of ion exchange membranes a compromise must be struck between a desirably high selectivity and a desirably low electrical resistivity.

The theory has been advanced that the high resistivity of membranes of high selectivity is due to the relatively fine pore size of the membrane in which each pore, filled with an ionic liquid, represents a separate conductor.

The pore size is normally non-uniform in the sense that a continuous pore passage leading from one membrane surface to the other has wider and narrower portions. Pore portions may be so narrow as not to accommodate mobile ions with their solvent shells, particularly within the range of low ionic concentration in which the solvent shell of each ion is relatively large. Thus, narrow pore portions impede the passage of ions therethrough and contribute to high electrical resistance of the membrane.

On the other hand, large pore passages of low electrical resistance not only accommodate ions of the opposite polarity with respect to the fixed or bound charges of the matrix material, but permit also ions of the same polarity to pass therethrough, resulting in poor selectivity of the membrane whose electrical resistivity might otherwise be satisfactory. For this reason it is undesirable to produce a membrane having originally relatively large pore passage where selectivity of the membrane is important.

The invention provides among other features a treatment of manufactured membranes which structurally alters the membrane in such a way as to increase the membrane conductivity without a proportional reduction in selectivity.

The inventive method is applicable to any of the known and commercially available membranes of heat softenable synthetic resin, and the treatment may be carried as a separate treatment of a manufactured membrane to improve its properties, or as a final step of its manufacture. The method lends itself to continuous treatment of material in continuous sheet or roll form, as well as to the treatment of individual cut sheets or stacks of sheets.

The invention is also applicable to resinous permselective membranes of non-heat softenable character, the sole requirement being that the membrane material passes from a soft to a harder state. This may occur as a result of polymerization, copolymerization or crosslinking or an escape of a solvent.

The principal aspect of the method of treatment is the passage of a relatively strong electric current through the membrane under a condition under which the membrane matrix has less than its normal strength. In heat softenable material this may be accomplished by heat development incidental to the passage of the electric current, or by heating of the liquid within which the membrane material is immersed, or a combination of both. In non-heat softenable material this may be accomplished by temporary softening, for example by addition of a solvent.

The temperature and the electric current to be chosen depend on the particular ion exchange material to be treated and may readily be ascertained by a separate test of certain physical properties of the material.

The principle underlying the test and manners in which it is to be carried out will readily be understood from the following observation.

It may be assumed that a piece of heat softenable membrane material is placed as a dividing membrane between the electrodes of a test apparatus filled with an ionic liquid. An electric current of considerable magnitude is passed through the membrane and the potential is observed which is necessary to maintain that current. The temperature of the membrane and liquid is then gradually increased. It will then be observed that with an increase in temperature the required potential decreases. This decrease may be plotted against the temperature and represents a curve of even and continuous decline, due to the decrease in resistivity of the electrolyte and of the membrane. At a certain temperature, however, a break or discontinuity is noted in the curve and beyond this point the required potential drops more rapidly than would normally be expected by a theoretical projection of the curve beyond that point.

It is my conclusion that the sudden potential drop is caused by a sudden change in the physical properties of the ion exchange material.

While it has not been possible so far visually to observe the sub-microscopic membrane structure, a reasonable explanation of the phenomenon is as follows:

It is known that the physical strength of the membrane material decreases suddenly at a yield point, so that, for example, a substantial elongation of the material may be produced by little or even no increase in load beyond a certain point. The yield point may be lowered by increasing the temperature of the material.

The narrow pores of the material which offer a substantial physical resistance to a passage of relatively large ions below the yield point suddenly offer reduced resistance to the pressure of the ions at a condition beyond the yield point, hence open up, and result in a condition of reduced resistivity of the material.

Two variables are involved, temperature and current, or temperature and potential, as it is clear that the greater the pressure of the ion, the sooner the physical resistance of the narrow pores to opening is overcome.

As will become apparent from the following detailed description, the moment at which the yield point is exceeded is relatively easy to determine in the actual practice of the invention, so that it is not even necessary to conduct a separate test or to plot curves in preparation of each treatment.

It is advantageous to "set" the membrane after the treatment by the electric current, either by cooling under controlled conditions, for example by maintaining during cooling a flow of current through the membrane, or by a crosslinking treatment supplementary to previous crosslinking of the membrane material prior to the treatment. Prior or during setting the membrane may be shaped to assume any desired contour, such as corrugations, pimples to serve as spacers, etc.

Heating of the membrane material may be accomplished in various ways. The material may be immersed in a heated ionic liquid, may be held between heated electrodes, may be heated internally by the treatment current only or be heated in addition by a high frequency current passing through it.

Membranes which tend to warp or buckle during the treatment, particularly under a brief but very intense treatment, may be guided or supported between appropriate guides or supports such as membrane spacers, perforated plates, etc., to insure stability of form.

The electric treatment current may be applied as a direct current, an interrupted direct current, or as an alternating current to reduce polarization effects.

The alternating current should preferably be of a relatively low frequency, such as 60 c. or less, as a high frequency current tends to produce heat only, but has little pore reshaping effect, as the ions do not move far enough during each cycle to change position from one fixed charge to the next, or even further locations in the matrix.

Direct current pulses of a duration sufficiently short to avoid overheating of the membranes in case of application of high current densities and to avoid polarization effects while yet permitting application of relatively high current density are advantageous. Such current pulses may be of a duration of one-tenth of a second to several seconds.

Alternating current pulses provide similar advantages.

The membranes may be treated under conditions substantially preventive of absorption of solvent. This may be accomplished by maintaining high the ionic concentration of the ionic liquid in which the membrane is immersed.

Synthetic resinous materials which may be treated by this method are broadly all those which pass from a soft state into a hardened state, including materials which pass from a liquid state into a hardened state.

This may occur in the course of manufacture where an originally liquid or fluid material hardens by cooling, polymerization, copolymerization, or crosslinking. In these instances the material did not previously exist in a hardened state.

It may also occur by cooling of a heat softenable material which was previously heated to soften it.

In some instances no appreciable external heating may be required if the electric pressure is great enough either per se or in combination with the internal heating incidental to the passage of the current.

The various aims, objects and advantages of this invention will appear more fully from the detailed description which follows, accompanied by drawings showing, for the purpose of illustration, how the invention may be carried out.

Although the characteristic features of the invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 1:
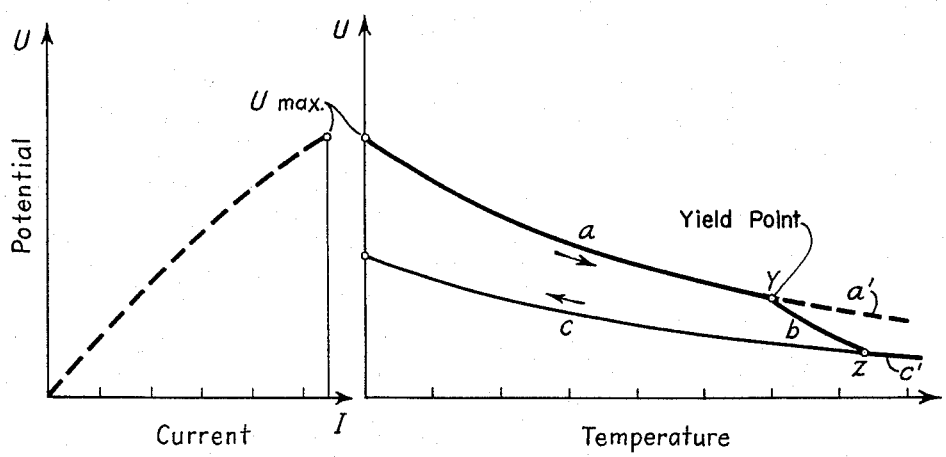
FIGS. 1 and 2 are graphs illustrating a principle underlying the present invention.

In the following description and in the claims various details will be identified by specific names for convenience. The names, however, are intended to be generic in their application. Corresponding reference characters refer to corresponding parts in the several figures of the drawings.

The following description discloses certain specific details of the invention for the purpose of explanation of its broader aspects, but it is understood that details may be modified in various respects without departure from the principles of the invention and that the invention may be practiced by other devices than shown.

Figure 3:
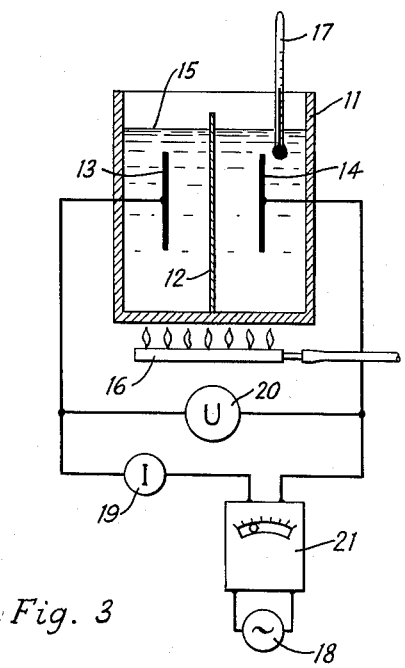
FIG. 3 is a diagrammatic illustration of an apparatus for ascertaining the graphs of FIGS. 1 and 2.

FIG. 3 illustrates a test cell 11 in which a membrane 12 may be inserted for a test between electrodes 13 and 14. The cell is filled with an electrolyte 15, for example aqueous KCl solution, and a heater 16 permits raising of the temperature of the cell which may then be read at a thermometer 17. A generator 18 supplies alternating current I readable at a milliammeter 19 and the potential U applied to the electrodes is readable at a voltmeter 20 preferably of the recording type. The electrode current is maintained constant by a settable current regulator 21.

At the beginning of the test the current I is gradually increased to an arbitrary figure $I_{set}$. The potential $U_{max}$ is noted which corresponds to the current $I_{set}$. At this time the cell is at a certain low temperature, for example room temperature of the order of 20° C. This condition is represented by the left portion of the graph, FIG. 1.

Next, the temperature of the cell is gradually increased. The temperature increase is due, in part, to the heating of membrane and electrolyte by the electric current, and additional heat is supplied by the heater 16, preferably in such a manner that the increase per time unit is constant, for example 1° C. per minute. The current $I_{set}$ is maintained constant by the current control and the potential U is noted and plotted. U decreases steadily, as would be expected from the fact that the resistivity of the electrolyte decreases with an increase in temperature. Portion $a$ of the curve represents the decline of U which is steady until a point Y is reached beyond which the potential declines more rapidly than expected, the expected change of U being represented by the broken line $a'$ projected beyond point Y.

Curve portion $b$ gradually assumes a course $c'$ roughly parallel to, but lower than $a'$ beyond point Z.

If the supply of heat is now discontinued and the cell permitted to cool, the potential U will follow curve $c$ and reach a value at the starting temperature substantially lower than $U_{max}$.

For the purpose of this description, I term the point Y the yield point. It marks the beginning of a critical range $b$ within which a drastic reduction of membrane resistivity occurs which is permanent as evidenced by curve portion $c$ which lies substantially below portion $a$.

Without wishing to base my invention and discovery on the correctness of this explanation, it would seem a reasonable explanation to assume that at the yield point the physical strength of the membrane material is sufficiently reduced to permit ions to push through previously impassable portions of the membrane matrix. This appears to involve opening of narrow passages under the pressure of the ions. As the membrane material cools, the passages remain open. Thus the pore opening seems to be in the nature of a permanent deformation of the matrix of the membrane and occurs in the direction of the electric current, but not at right angles thereto. It is therefore a directional change of the membrane material.

Two forces appear to be involved, the strength of the membrane material resisting deformation, the strength of the material being reducible by heating, and the pressure of the ions, due to the potential U, trying to pass through the pore passages from one bound charge to the next.

Figure 2:
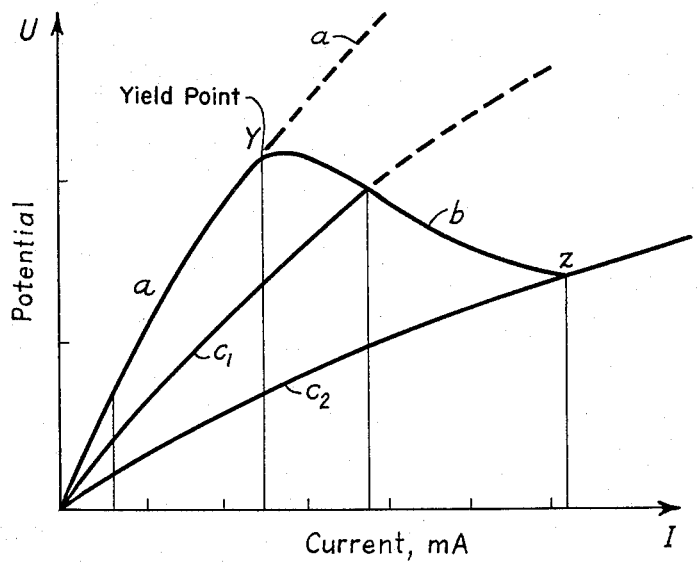

FIG. 2 illustrates the potential (U) vs. current (I) relationship at substantially unchanged cell temperature except for minor changes in temperature due to the increase in current which may occur.

As portion $a$ of the curve of FIG. 2 shows, an increase in current (I) is accompanied by an increase in potential (U) until $U_{max}$ is reached at Y. Beyond this point the potential required to sustain increasing current decreases along portion $b$, and a subsequent decrease in current is accompanied by lower potentials as represented by $c_1$ and $c_3$. The portion $b$ of the curve represents the zone most suitable for treatment. If the current corresponding to Z is exceeded, it is again accompanied by an increase in potential.

No attempt was made to correct graph FIG. 2 to compensate for changes in temperature of the membrane incidental to the passage of the electric current therethrough nor for corresponding changes in electrolyte temperature, as the purpose of the curves is merely to illustrate the critical changes occurring at the yield point.

As illustrated in FIG. 1, the yield point may be reached at a relatively low preset current by increasing the temperature of the membrane and the electrolyte.

The yield point may also be reached by applying a stronger current without any material increase in the electrolyte temperature. In the latter case internal local heating of the membrane material by the current causes the yield point to be exceeded (FIG. 2).

As will become apparent from the following description, it is a relatively simple matter to determine the condition at which the yield point Y is exceeded and the favorable range for treatment begins.

Figure 4:
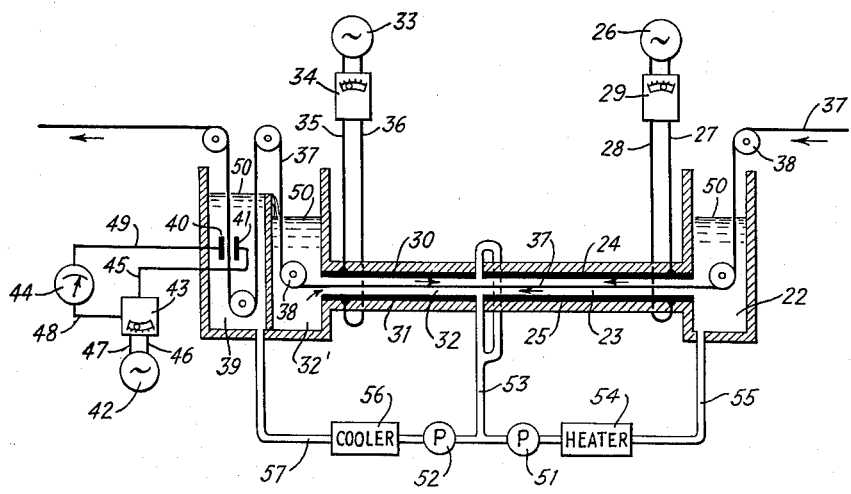
FIG. 4 is an elevational generally diagrammatic illustration of an apparatus for practicing the invention by continuous treatment of membrane material in roll form.

The apparatus shown in FIG. 4 comprises a preheating chamber 22 followed by a treatment chamber 23 including electrodes 24 and 25. A generator of alternating current 26 supplies electrical energy to the electrodes 24 and 25 through leads 27 and 28. A current regulator 29 insures maintenance of a presettable constant current.

A second pair of electrodes 30 and 31 in a cooling and setting chamber 32 is supplied with alternating current from a second source 33 and a current regulator 34 through leads 35 and 36. The cooling and setting chamber 32 is followed by an exit chamber 32' through which the membrane material 37, which is guided through the apparatus by rollers 38, leaves in treated condition.

A testing compartment 39 may be provided comprising a pair of test electrodes 40, 41 between which the membrane 37 passes. A test circuit comprises a source of alternating current 42, a voltage regulator 43, a milliammeter 44 and leads 45–49.

Electrolyte 50 is circulated through the apparatus by pumps 51 and 52 which withdraw electrolyte through a duct 53 between the chambers 23 and 32. Pump 51 forces electrolyte through a thermostatically controlled heater 54 and discharges hot electrolyte into the chamber 22 through a duct 55.

Pump 52 forces electrolyte through a thermostatically controlled cooler 56 and discharges cooled electrolyte through a duct 57 into the testing compartment 39 whence it passes by overflow into exit chamber 32' and finally into the cooling and setting chamber 32 from which it is then withdrawn through duct 53.

The liquid flow is preferably concurrent with respect to the advance of the membrane material within the preheating and the treatment portion of the apparatus and countercurrent within the cooling and setting portion. This arrangement permits a rapid temperature increase of the membrane during the treatment phase within the chamber 23 due to the heating action of the electric current and gradual cooling of the membrane material upon entry into the cooling and setting chamber.

The operation of the apparatus of FIG. 4 is as follows:

Heated and cooled electrolyte is circulated through chambers 23 and 32, respectively, and membrane material 37 is slowly drawn through the apparatus from right to left. The voltage regulator 43 is adjusted to produce a test current of the order of about 3 milliamps readable at the milliammeter 44. The treatment current is then gradually increased by suitable adjustment of the current regulator 29 until the yield point of the membrane material is exceeded, which is evidenced by a sudden increase of the test current observed at 44. For example, the current may increase from 3 to over 5 milliamps due to the sudden reduction in resistivity of the treated membrane material. In some instances the test current may increase to 10, even 15 ma. The setting of the current regulator 29 is then left undisturbed at the setting which produced the sudden increase in the test current.

The setting current regulator 34 is adjusted to a setting current between electrodes 30 and 31 less than the treatment current between the treatment electrodes 24 and 25. The sole purpose of this current is to maintain a passage of ions through the membrane passages opened or enlarged during the preceding treatment to prevent closing of such passages before the membrane material is being cooled and set.

It should be noted that the actual magnitude of the treatment current and of the treatment potential need not be known, as the milliammeter 44 gives a reliable indication whether and to what extent the treatment is being carried out.

Figure 5:
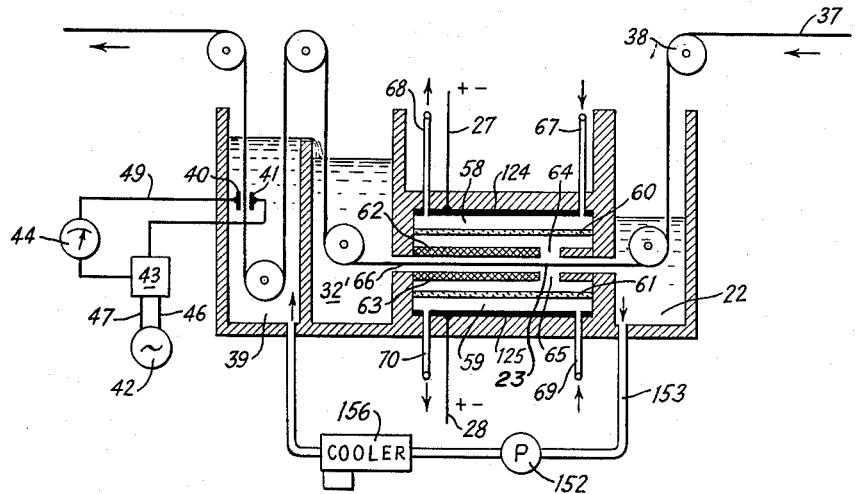
FIG. 5 is a similar illustration of a modified apparatus.

The apparatus shown in FIG. 5 corresponds in many respects to that of FIG. 4 except for details of the treatment chamber. Corresponding reference numerals are applied and it will be unnecessary to describe it except for the modifications which are as follows.

Electrodes 124 and 125 are mounted in electrode chambers 58 and 59 and are separated from the treatment chamber 23 by suitable liquid barriers 60 and 61 which may consist of conductive ion exchange membranes or of thin porous ceramic material. Barriers 60, 61 should have a relatively high conductivity.

The electrode exposure with respect to the membrane material is restricted by porous walls 62, 63 of lower conductivity than membranes 60, 61 and having apertures 64, 65 therein. The apertures provide a restricted area through which a strong current passes between the electrodes through the membrane material while a lesser current passes through the porous walls 62, 63 themselves.

The pump 152 circulates electrolyte from the chamber 22 through the cooler 156 into the testing compartment 39 whence it passes through chamber 32' into the treatment passage 66 where its temperature is increased by the electric current passing through it. The electrolyte then passes into chamber 22 from which it is finally withdrawn through duct 153 for recirculation. Electrolyte for the electrode chambers is supplied and withdrawn through ducts 67, 68, 69, 70.

The sole heat supplied to the electrolyte and to the membrane material is heat developed by the electric current. The electrolyte passing through the passage 66 is initially cool and cools the treated membrane. It gradually accumulates heat and leaves the passage 66 to enter the chamber 22 warmer than it entered the passage. The current density obtainable by the illustrated arrangement is higher than in FIG. 4.

The operation of the apparatus of FIG. 5 corresponds to that of FIG. 4. More particularly, the current is controlled by means corresponding to those shown in FIG. 4 at 26 to 29. The milliammeter 44 serves as a guide in adjusting the operation so that the yield point of the material is exceeded.

Figure 6:
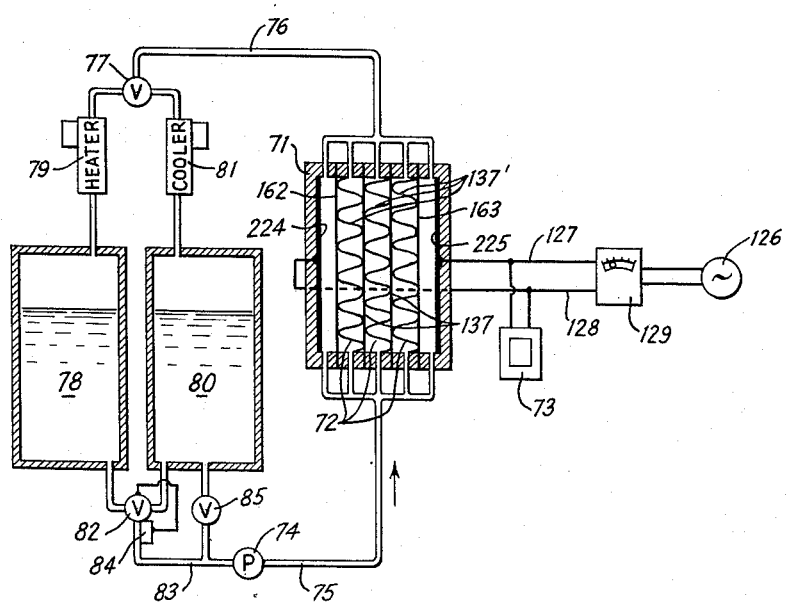
FIG. 6 illustrates diagrammatically an apparatus for batch treatment of membranes.

The apparatus shown in FIG. 6 is an example of an apparatus for the batch treatment of cut membranes 137 installed between supporting porous spacers 137' in a cell 71 comprising electrodes 224 and 225 and ceramic membranes 162 and 163 separating the electrode chambers from the central treating chamber 72.

A source of electric current, preferably alternating current 126, is connected to the electrodes 224 and 225 through leads 127 and 128.

A current regulator 129 permits the current to be initially adjusted and thereafter maintained constant. A voltmeter 73 preferably of the recording type indicates the potential applied to the electrodes to maintain the preset current. This voltmeter corresponds to the voltmeter 20 in FIG. 3 and records a graph resembling FIG.

2 (portions *a* and *b*) from which the yield point Y can be determined, as hereinbefore explained.

A pump 74 feeds electrolyte through the cell through duct 75 and electrolyte leaves the cell through a further duct 76 leading to a valve 77. Depending upon the valve setting, the electrolyte either passes into a storage tank 78 for warm electrolyte through a heating unit 79 or into a storage tank 80 for cold electrolyte through a cooling unit 81.

The pump 74 withdraws electrolyte from either tank 78 or 80 through a valve 82 and duct 83. The valve 82 is a mixing valve and comprises an adjustable thermostat 84 for maintaining a preset temperature constant. A further valve 85 is provided for feeding cold electrolyte to the pump 74 after passage of warm electrolyte through the cell 71.

After installation of membranes in the treatment cell for treatment the current is adjusted at 129 and the temperature of the electrolyte is gradually increased at 84 until the voltmeter 73 indicates that the yield point conditions is exceeded. The membranes are subsequently cooled and set by passage of cold electrolyte through the cell during which period a current may be maintained through the membranes as hereinbefore explained.

In actual practice the cell 71 contains a great number of membranes 137 for simultaneous treatment. In the illustration only two such membranes are shown for reasons of simplicity.

Figure 7:
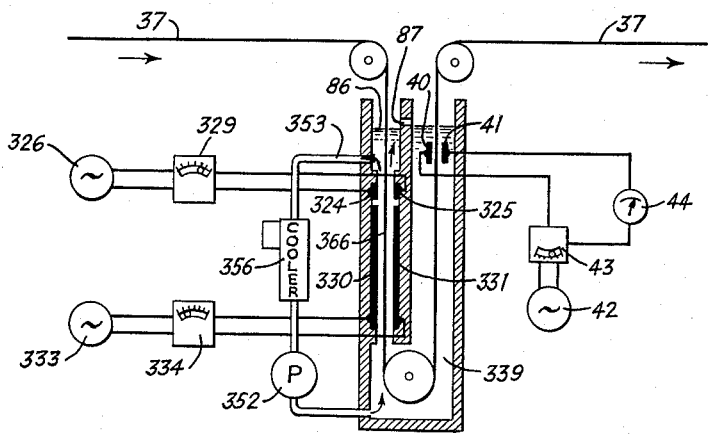
FIGS. 7 and 8 are diagrammatic illustrations of modified forms of apparatus for continuous treatment of membrane material in roll form.

The apparatus of FIGURE 7 is an example of an apparatus for treatment of the membrane material under conditions of high current density.

The membrane material 37 passes through a treatment chamber and encounters first an electric field of high current density between electrodes 324 and 325. Power is supplied by a generator 326 and a current regulator 329. Subsequently the membrane material passes between extended electrodes 330 and 331 of a cooling and setting zone. An electric field of low current density is maintained between these electrodes by a generator 333 and a current regulator 334.

A pump 352 circulates electrolyte cooled by a cooling unit 356 through the apparatus. The cooled electrolyte passes through the treatment chamber 366 in a direction opposed to the advance of the membrane material and is withdrawn through a duct 353 from a chamber 86 in advance of the treating chamber 366.

Figure 10:
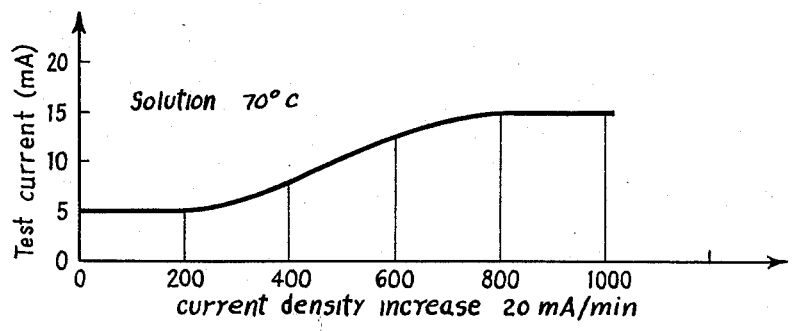

Electrolyte also passes through the testing chamber 339 between test electrodes 40 and 41 in the circuit of a milliammeter 44. The voltage regulator 43 applies a constant voltage to the electrodes 40 and 41 and the milliammeter 44 indicates or records the momentary operating condition in relation to the yield point. When the yield point is exceeded, by increase of the current density between electrodes 324 and 325 or by decrease in the rate of feed of the membrane material through the apparatus, the milliammeter registers a sudden increase in test current. FIG. 10 is an example of such a curve. From the test chamber electrolyte passes through an overflow passage 87 into the chamber 86.

Figure 8:
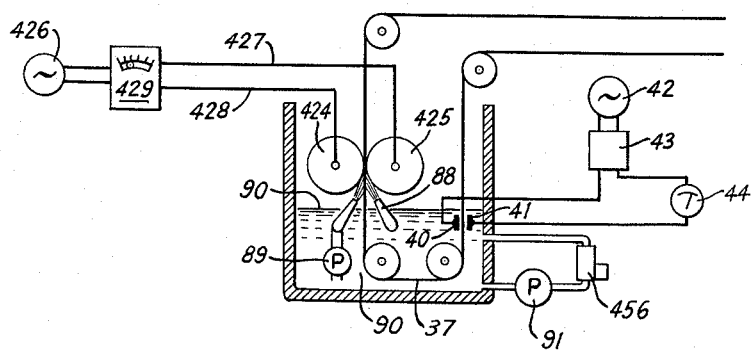

In the apparatus of FIG. 8 the electrodes 424 and 425 are in the shape of rollers. A generator 426 and a current regulator 429 supply A.C. power through leads 427 and 428. The wet equilibrated membrane material 37 passes between the rollers and a spray of cooled electrolyte is directed against the membrane material by nozzles 88 supplied by a pump 89 from a pool 90 of electrolyte which is being circulated by a further pump 91 through a cooler 456. The testing circuit 40 to 44 is the same as in FIG. 7.

Figure 9:
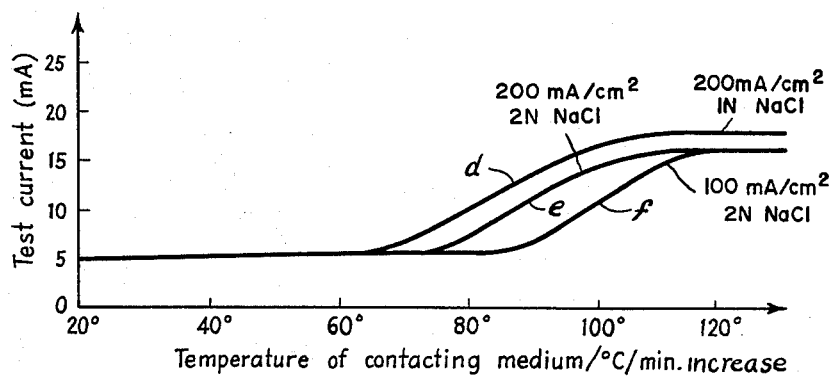
FIGS. 9 and 10 are representative graphs which may be recorded by recording milliammeters associated with any of the apparatus of FIGS. 4, 5, 7 and 8 indicating operation above the critical yield point of the membrane material.

FIG. 9 shows a typical graph representing changes in the test current (circuit 40 to 44) in dependence on changes in temperature of the electrolyte of the treatment zone. The voltage regulator (43) was preset to produce a test current of 5 ma. through the untreated membranes. The temperature of the electrolyte within the treatment zone was increased at the rate of one degree C. per minute leading to an increase in the test current of about 200 percent when the yield point condition was exceeded. Curve *d* represents treatment at 200 ma./cm.$^2$ in an electrolyte of 1 N. NaCl in water. Curve *e* represents treatment at 200 ma./cm.$^2$ in an electrolyte of 2 N. NaCl in water. Curve *f* represents treatment at 100 ma./cm.$^2$ in an electrolyte of 2 N. NaCl in water.

FIG. 10 shows a curve representing changes in the test current in dependence on changes in the treatment current in an electrolyte whose temperature was maintained substantially constant at 70° C. The curve shows that the yield point condition was not reached until the treatment current exceeded 200 ma. and, further, that a treatment current of in excess of 800 ma. produced no marked improvement over a treatment current of about 700 ma.

Figure 11:
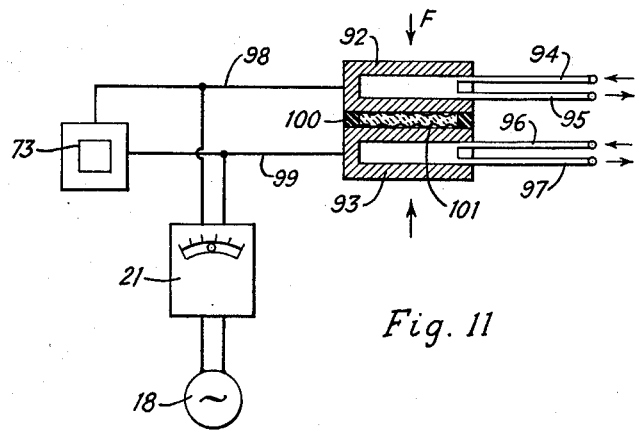
FIG. 11 shows still another form of apparatus for practicing the invention.

FIG. 11 shows a further apparatus comprising hollow electrodes 92, 93 through which hot or cold liquid may be circulated by ducts 94, 95, 96 and 97 for the purpose of heating or cooling the electrodes. The membrane faces may be contoured in any desired manner to shape the membrane. A generator 18 supplies an electrical potential to the electrodes through leads 98, 99, the magnitude of the current being controlled by a current regulator 21. A recording voltmeter 73 records changes in the electrode potential.

The space between the electrodes comprises a soft rubber gasket 100 peripherally confining the membrane material 101 to be processed and/or treated, as will hereinafter appear. The electrodes may be forced together to apply a desired compressive force. This is indicated by arrows F. In actual practice this is readily accomplished by placing a weight on electrode 92.

The present method may be applied, among other membranes, to those comprising a heat softenable synthetic resin matrix.

An example of such membrane material is one in which a polyethylene or polypropylene matrix, crosslinked to a higher or lower degree, carries 10 to 50% styrene monomers which are graft-polymerized to the matrix. The styrene monomers are sulfonated in case of a cation membrane, and aminated or quaternized in case of an anion membrane. The graft polymerization is generally accomplished by irradiation, and crosslinking is accomplished by germicidal ultraviolet rays, Grenz rays, X rays or radiation from atomic or nuclear reactors. Such membranes are known and are commercially available as "Amfion" membranes. A description of the process of making such membranes is found in French Patent No. 1,777,380 and South African Patent No. 1900/57 of American Machine and Foundry Company (AFM).

Another type of membrane consists of interpolymer material such as a mixture of Dynel polymer and 20 to 50% polystyrene which is either sulfonated or aminated or quaternized, as the case may be. The polymers usually have molecular weights between 20,000 and 100,000. A known method of producing such membranes involves preparation of a solution of the polymers in a solvent such as N,N-dimethyl formamide, casting and drying, followed by activation in an aqueous ionic solution. The membranes are preferentially post crosslinked with dicumyl peroxide or other catalysts. The making of such membranes is described by Whetstone, Gregor et al. in the Journal of Physical Chemistry, pp. 141, 147 and 151, February 1957.

South African Patent 1202/55 discloses synthetic resinous ion exchange membrane materials which are heat— or solvent—softenable and lend themselves to treatment by this invention.

United States patents to Graydon No. 2,877,191 and Clarke No. 2,730,768 disclose membranes consisting of a crosslinked mixture of styrene monomers and either sulfonated or aminated or quaternized styrene compounds with a special crosslinking agent such as divinyl benzene.

Similar membranes may be made by using a matrix forming polymer such as polystyrene instead of a monomer. Both the last named types of membranes may be initially produced with a low degree of crosslinking such as 1 to 2 percent, but containing enough additional divinyl benzene to cause additional crosslinking during a treatment subsequent to the pore opening or enlarging treatment.

The electrolytes suitable for practicing the invention comprise an ionic portion which may be inorganic or organic, and a solvent portion which may also be inorganic or organic. This permits of four combinations of ions and solvents.

For example, inorganic ions may be solvated in an inorganic solvent such as Na and Cl in water. Inorganic ions may be solvated in an organic solvent such as Li and F in ethyl alcohol. Organic ions may be solvated in an inorganic solvent such as tetramethylammonium chloride in water. Organic ions may be solvated in an organic solvent such as tetraethylammonium chloride in ethyl alcohol.

It is required that the ionic solution contained in the membrane pores is in liquid form at the treatment temperature. Where this temperature exceeds the boiling point of water at the operating pressure, the use of a high boiling point solvent, such as ethylene glycol or glycerol, with or without addition of water, is indicated. Treatment temperature in excess of 100° C. may be obtained with water as a solvent if the operating pressure is raised sufficiently to prevent boiling.

If organic solvents are employed, it is preferred to select polar solvents having a dielectric constant in excess of 10.

In all instances the solution must be an ionic solution, i.e., an electrolyte in distinction to solutions which are nonionic or nonconductive.

The method may be carried out with electrolytes of inorganic or organic nature. The latter may be prepared from surface active agents in a suitable solvent which itself may be inorganic or organic.

As will be shown by example, the matrix may be softened by a matrix softening solvent, but it is not necessary that such solvent forms an ionic solution. It may be benzene, for example, in case of a polyethylene matrix. Its function is to keep the matrix in a soft relatively yielding condition during the period of treatment. The subsequent hardening of the matrix is brought about by removal of the solvent.

A polyethylene matrix may contain 5 percent benzene in its softened state. The low boiling point of 80° C. of benzene permits benzene to be driven out by treating to about 90° C. Thus the process may be carried out at temperatures below the boiling point of water, whereas otherwise treatment temperatures in excess of 100° C. may be required to produce a comparable degree of softening. In this manner the need for high boiling point electrolytes or pressurization of the apparatus to prevent low boiling point electrolyte from boiling is obviated.

| Matrix material: | Solvent and boiling point |
|---|---|
| Polyethylene | Benzene, 80° C. |
| | Xylene, 144° C. |
| Dynel | Acetone, 56.5° C. |
| Nylon | Formic acid, 100.7° C. |

The solvent for the matrix may also constitute a solvent for the ions as will be shown by the nylon Example No. 13 which follows. In order to harden the matrix in such a case the electrolyte component is replaced by another solvent, e.g., water. This causes the matrix solvent, for example the formic acid, to be displaced from the nylon matrix structure with the result of hardening of the matrix.

Examples

*Example 1a.*—In the apparatus of FIG. 4 the current in the treatment zone 23 was adjusted to a density of 500 ma./cm.$^2$ of membrane surface. The 60 c. alternating current in the cooling and setting zone 32 was adjusted to 350 ma./cm.$^2$. Electrolyte: aqueous 0.1 N. NaCl solution. Membrane rate of advance adjusted to provide 5 minutes exposure of the membrane within the treatment zone 23.

After an equilibrium was established the test current was adjusted to 4 ma. by appropriate setting of the voltage regulator 43. The electrolyte flowing from the treatment zone was then heated by adjustment of the heater 54 to cause a rise in temperature by approximately 1° C. per minute until the test current rose to 12 ma. per cm.$^2$.

Results:

| | Area resistance (ohms/cm.$^2$) | |
|---|---|---|
| | Untreated | Treated |
| "Amfion" cation membrane | 14 | 5 |
| Graydon cation membrane | 17 | 6 |

The selectivity changed little. The cation transference number of 0.95 of the "Amfion" membrane before treatment changed to 0.93 after treatment.

*Example 1b.*—Operating data same as in Example 1a except that the electrolyte was aqueous 3 N. KCl solution and that the treatment current was 600 ma./cm.$^2$ D.C. and test current rose to 8 ma./cm.$^2$.

Results:

| | Area resistance (ohms/cm.$^2$) | |
|---|---|---|
| | Untreated | Treated |
| "Amfion" cation membrane | 14 | 6 |

The transference number for cations changed from 0.95 to 0.94.

*Example 2a.*—In the apparatus of FIG. 6 three membranes of the kind to be treated were installed and the apparatus prepared for the treatment as follows:

Flow velocity between the membranes about 6 cm./sec. Electrolyte: 5 N. KCl. Cold tank 80 temperature 20° C.; hot tank 78 temperature 100° C. Valves 77 and 82 set to draw electrolyte from hot tank. Current 60 c. A.C. adjusted at 129 to 1500 ma. after the recording voltmeter indicated maintenance of a substantially constant voltage. Heat control 83 adjusted to cause a temperature increase of about 1° C. per minute in cell 71. The voltmeter 73 was observed to record a gradually declining voltage up to a point where the rate of decline increased abruptly and continued at the increased rate until the decrease gradually flattened out to a rate substantially equal to that before the anomaly in the curve. The temperature control was set to maintain operation well within the zone of increased decline. The membranes were then cooled for about 5 minutes by flow of cold electrolyte through the apparatus and finally removed, thus completing the preparation of the apparatus for treatment. New membranes were then installed and heated at the previously set current in hot electrolyte for 5 minutes and cold electrolyte for 5 minutes, removed and equilibrated in 0.1 NaCl solution.

Results:

| | Area resistance (ohms/cm.$^2$) | |
|---|---|---|
| | Before | After |
| Nalco cation membranes | 21 | 11 |
| "Amfion" anion membranes | 16 | 9 |
| Graydon cation membranes | 17 | 10 |
| Graydon cation membranes (treated hot 24 hrs.) | 17 | 9 |
| "Amfion" cation membranes | 14 | 7 |

Extended treatment of the Graydon membrane resulted in additional crosslinking as evidenced by greater hardness of the membrane as ascertained by smaller indentations in the membrane surface by test pins under the same load.

*Example 2b.*—The apparatus of Example 2a was pressurized to 8 kg./cm.$^2$ to permit maintenance of the temperature in the tank 78 at 130° C. The electrolyte was 1 N. LiF in water. During treatment the electrolyte between the membranes reached a temperature of about 115° C. In other respects the treatment followed that of Example 2a.
Results:

|  | Area resistance (ohms/cm.$^2$) | |
| --- | --- | --- |
|  | Untreated | Treated |
| "Amfion" cation membrane | 14 | 2.6 |
| "Amfion" anion membrane | 16 | 2.2 |

*Example 2c.*—Instead of pressurizing the apparatus of FIG. 6 to maintain an electrolyte temperature above 100° C. an electrolyte of 0.6 N. NaF in water was used to which sufficient ethylene glycol was added to raise the boiling temperature of the mixture to 135° C. The treatment temperature was 115° C. and the current density was 900 ma./cm.$^2$.
Results:

|  | Area resistance (ohms/cm.$^2$) | |
| --- | --- | --- |
|  | Untreated | Treated |
| "Amfion" cation membrane | 14 | 2.1 |
| "Amfion" anion membrane | 16 | 1.9 |

*Example 2d.*—A mixture of aqueous 0.6 N. NaF and ethylene glycol was prepared, the amount of ethylene glycol being sufficient to raise the boiling point of the mixture to 135° C.

"Amfion" cation membranes and "Amfion" anion membranes were immersed in a bath of the mixture and heated to a temperature of 120° C. for two minutes between supporting porous plates (treatment A).

Thereafter the membranes were installed in the apparatus of FIG. 6 and treated electrically. A first batch was treated in the above mixture serving as electrolyte at a temperature of 30° C. and at a current density of 900 ma./cm.$^2$ (treatment B).

A second batch of membranes was treated in the same manner, but at an electrolyte temperature of 115° C. followed by cooling to 20° C. (treatment C).
Results:

|  | Area resistance (ohms/cm.$^2$) | | | |
| --- | --- | --- | --- | --- |
|  | Untreated | Treated | | |
|  |  | (A) | (B) | (C) |
| "Amfion" cation membrane | 6 | 5.2 | 2.7 | .83 |
| "Amfion" anion membrane | 7 | 3.1 | 1.9 | 1.2 |

The tests show a slight improvement in membrane conductivity by the electrolyte under a condition under which the membrane material is weakened.

Ions whose solvent shell is distorted in shape in narrow pore passages may reshape their solvent shells toward a more spherical shape when the weakened membrane structure permits expansion of the narrow pore passage under the pressure of the ion. The pore reshaping force exerted in this case by non-moving ions is limited and the improvement obtained is quite modest as compared to electrically driven ions.

*Example 3a.*—Apparatus and operating conditions same as in Example 2a except for the following particulars: Electrolyte: 0.1 N. LiCl in water solution. Current 500 ma./cm.$^2$ 60 c. A.C.
Results:

|  | Ohms/cm.$^2$ | |
| --- | --- | --- |
|  | Before | After |
| Nalco cation membranes | 21 | 7 |
| Graydon cation membranes | 17 | 7.5 |

*Example 3b.*—Operating data same as in Example 3a except that the electrolyte was an aqueous saturated (at 50° C.) LiCl solution.
Results:

|  | Ohms/cm.$^2$ | |
| --- | --- | --- |
|  | Before | After |
| Graydon cation membranes | 18 | 11 |

*Comment.*—Treatment 3b was carried out under a highly dehydrating condition of an ionic solution of more than 12 N. The membrane before treatment had a mobile ion concentration in its contained liquid of less than 6 N. The result is a membrane of relatively low liquid content and a selectivity not lower than that of the untreated membrane. Treatment 3a was carried out under a condition of lower ion concentration in the electrolyte than in the membrane pore liquid.

The treatment 3a resulted in a substantial reduction in area resistance accompanied by an increase in water content of about 15 percent. Treatment 3b resulted in a membrane having no determinable increase in water content and slightly improved selectivity. The cation transfer number increased from 0.94 to 0.95 under equal measuring conditions.

*Example 3c.*—Operating data same as in Example 3b except that a direct current of 120 ma. was applied.
Results:

|  | Ohms/cm.$^2$ | |
| --- | --- | --- |
|  | Before | After |
| Graydon cation membranes | 17 | 12 |

*Example 3d.*—Operating data same as in Example 3b except that a direct current of 300 ma. was applied for ½ second followed by a pause of 2 seconds' duration, current for ½ second, and so forth.
Results:

|  | Ohms/cm.$^2$ | |
| --- | --- | --- |
|  | Before | After |
| Graydon cation membranes | 17 | 11 |

*Example 4a.*—The apparatus of FIG. 6 was operated with cold (20° C.) electrolyte only. Electrolyte: aqueous 1 N NaCl solution. Flow velocity 6 cm./sec. The current regulator 129 was omitted. Alternating current of 60 c. was supplied to the limits of the apparatus read on an ammeter installed in lead 127 indicating 4 amps/ cm.$^2$ for 10 seconds. The current was then gradually reduced to zero within 30 seconds.

Results:

|  | Ohms/cm.$^2$ | |
| --- | --- | --- |
|  | Before | After |
| Graydon cation membranes | 17 | 13 |

*Comment.*—The sudden decrease in the current indicated that the yield point was exceeded, at least within the interior of the membranes while the surfaces of the membranes were being cooled to about 20° C.

*Example 4b.*—The test of Example 4a was repeated with the electrolyte at a temperature of 40° C.

Results:

|  | Ohms/cm.$^2$ | |
| --- | --- | --- |
|  | Before | After |
| Graydon cation membranes | 17 | 11 |

*Example 5a.*—"Amfion" cation membranes and anion membranes were cut into strips 1 mm. wide and the strips were woven to form a tight mat in which anion strips are parallel and extend in one direction while cation strips extend at right angles thereto. The mat was treated like a solid membrane in the apparatus of FIG. 6. Electrolyte: 0.1 N LiF at 120° C. and 10 kg./cm.$^2$ pressure. Current density: 1500 ma./cm.$^2$.

Results:

|  | Ohms/cm.$^2$ | |
| --- | --- | --- |
|  | Before | After |
| "Amfion" material mat | 15 | 6 |

*Example 5b.*—Similarly polyethylene filaments of a thickness of 0.7 mm. were graft polymerized with styrene, and thereafter quaternized and sulfonated respectively as disclosed in South African Patent 1900/57 to produce filaments of anion exchange material and cation exchange material. The filaments were woven to form a tight screen in which the anion filaments run in one direction and the cation filaments run at right angles thereto. The screen was treated like a solid membrane in the apparatus of FIG. 6. Treatment data same as in Example 5a.

Results:

|  | Area resistance in 0.1 NaCl solution, ohms/cm.$^2$ | |
| --- | --- | --- |
|  | Before | After |
| Amphoteric screen | 19 | 12 |

*Example 6.*—The specific resistances of a Nalco cation membrane treated as in Example 2 were measured (a) in the direction of the membrane and (b) across the membrane, i.e., at right angles to the plane of the membrane.

|  | Before treatment | | After treatment | |
| --- | --- | --- | --- | --- |
|  | a | b | a | b |
| Specific resistances (ohms/cm.$^2$) | 550 | 700 | 450 | 300 |

The measurements indicate that the treatment reversed the characteristics of the membrane to the extent that in the untreated membrane the greater specific resistance was across the membrane, whereas in the treated membrane it was in the direction of the membrane.

*Example 7.*—1 cm.$^2$ of "Amfion" cation membrane was equilibrated in aqueous 1 N NaCl solution and then placed between the electrodes 92 and 93 of the apparatus of FIG. 11. The membrane was peripherally confined by a rubber seal 100. An electric alternating 60 cycle current of 1000 ma. was passed through the membrane and the temperature of the electrodes was increased slowly until the yield point was reached, as indicated by the break in the graph produced by the potential recorder 73.

In a first test (a) the electrodes touched the membrane lightly.

In a second test (b) the electrodes were forced together with a pressure of 50 kg./cm.$^2$.

Results:

|  | Treatment | | | |
| --- | --- | --- | --- | --- |
|  | Test a | | Test b | |
|  | Before | After | Before | After |
| Area resistance (ohms per cm.$^2$) | 14 | 2.8 | 14 | 3 |
| Selectivity (cation transference at 0.6 N KCl) | 0.95 | 0.94 | 0.95 | 0.96 |

*Comment.*—The test indicates that the treatment without compression of the membrane decreased the cation transfer number slightly, whereas compression resulted in a gain in selectivity. In both instances the resistivity was reduced to about one-fifth.

*Example 8.*—An amphoteric interpolymer type spacer was prepared from 20 percent (by weight) of sulfonated polystyrene, 20 percent quaternized polystyrene and 60 percent Dynel dissolved in N dimethyl formamide to form a viscous solution. A film was cast from the solution and dried sufficiently to permit handling. The film was then crosslinked with dicumyl peroxide and activated by immersion successively in aqueous 1 N HCl, 1 N NaOH, 1 N LiF, and finally 0.1 N LiF solution. The film was then perforated and placed between the corrugated faces of the electrodes of FIG. 11, a current of 500 ma. was passed through the film and the electrodes were heated until the yield point was passed. The electrodes were then cooled, the flow of current stopped, the spacer removed and a non-perforated portion tested in 0.1 N NaCl solution.

Results:

|  | Untreated spacer | Treated spacer |
| --- | --- | --- |
| Area resistance (ohms/cm.$^2$) | 38 | 9 |

*Comment.*—The treatment of the spacer between the electrodes 92 and 93 shaped it and thereafter prevented it from losing its corrugated shape. The peripheral seal 100 prevented the escape of liquid contained in the pores. The resulting structure forms a highly conductive spacer to be used between membranes of an electrodialysis apparatus.

*Example 9a.*—An amphoteric membrane was produced as follows:

An anionogenic constituent was prepared according to the disclosure of Clarke (supra) by the reaction of a mixture of 1 mol 2 vinyl pyridine and 1 mol dimethyl sulfate at 65° C. The mixture was then permitted to cool and represents an anionogenic substance readily convertible into an anionic substance by subsequent hydrolyzation.

The cationogenic constituent was propyl ester of styrene sulfonic acid and was prepared according to the disclosure of Graydon (supra).

One part of the anionogenic compound, one part of the cationogenic compound, 3 parts of styrene, and 2 parts of divinyl benzene together with 0.5 percent (by volume of the aforesaid constituents) benzoyl peroxide were mixed, a film was cast and heated to 65° C. until the film became a soft solid sufficiently crosslinked to permit handling. The film was removed from the mold and activated by successive immersion in aqueous 1 N NaOH, 1 N HCl, and 1 N NaCl solutions.

The soft film was placed in moist condition between the electrodes 92 and 93 and confined by the gasket 100. A current of 600 ma., 60 c. A.C. was passed through the membrane and the electrodes were heated to 75° C. The heat treatment was continued for 12 hours at which time the film had hardened into a tough solid. The electrodes were cooled and the membrane removed. The membrane was then equilibrated in 0.1 N. NaCl solution and tested.

*Results.*—(a) Membrane heat treated and current for 12 hours—area resistance (ohms/cm.$^2$)—12; (b) membrane heat treated for 12 hours, no current—area resistance (homs/cm.$^2$)—56.

*Comment.*—The hardened and toughened state of the membrane after treatment is the result of additional crosslinking which took place by internal and external heating. In the membrane through which a current was maintained during crosslinking improved conductivity resulted. The seal prevented escape of liquid from the pores and the membrane was confined by the electrodes against deformation. The treatment current was conducted by ions of both polarities.

*Example 9b.*—An improved amphoteric membrane was prepared as follows:

Anionogenic constituent: mixture of 1 mol 2 vinyl pyridine and 1 mol dimethyl sulfate reacted at 65° and permitted to cool.

Cationogenic constituent: propyl ester of styrene sulfonic acid.

A first compound was prepared from one part of anionogenic constituent, one part of styrene, one-half part of divinyl benzene, and 0.5 percent (by volume of the total) of benzoyl peroxide, by mixing and heating to 65° C. while stirring until the liquid thickens to a point short of forming a gel at which point it is cooled to retard further crosslinking. The resultant viscous liquid is mixed immediately with a compound B prepared as follows:

Compound B was prepared from one part of cationogenic constituent, 1 part of styrene, one-half part of divinyl benzene and 0.5 percent (by volume of the total) of benzoyl peroxide, by mixing and heating to 65° C. under stirring until the liquid reached a point short of forming a gel. At this point the liquid was cooled and combined with compound A in equal proportions, heated to 65° C. and cast into a form to produce a sheet.

The liquid gels to form first a relatively soft solid which may be removed for current treatment after activation as in Example 9a.

If left in the form, crosslinking continues until a hard solid is formed which again may be activated and forms an amphoteric untreated membrane for comparison purposes.

The activated partially crosslinked soft solid membrane may be further crosslinked by placing it between the electrodes 92 and 93 (FIG. 11) producing a post crosslinked membrane treated by passage of electric current therethrough or heat treated only without passage of current, as the case may be.

Results:
Area resistance (ohms/cm.$^2$)
Amphoteric membrane activated in solid state__ 38
Amphoteric membrane activated in soft state and post crosslinked _____ 22
Amphoteric membrane activated in soft state, post crosslinked and current treated after activation _____ 8

*Comment.*—The heating of compounds A and B individually promotes growth of the polymers essentially in three directions to produce a spherical form of polymer in distinction from a pure linear chain polymer. The resultant amphoteric membrane has conductance characteristics superior to the membrane produced from ionogenic monomers.

The constituents were readily combined in their respective cationogenic and anionogenic forms, i.e., prior to hydrolyzation, because in that form they are compatible with divinyl benzene and styrene with which they are to be combined.

Furthermore, the constituents are in polymer, rather than monomer, form and do not tend to cancel each other in their eventual activated form and as a result are more active as an amphoteric substance than would be a combination of monomers.

Mixing of the constituents with divinyl benzene, with or without addition of a diluent matrix forming compound such as styrene, and addition of benzoyl peroxide as a catalyst results in copolymerization and crosslinking and produces a soft solid of sufficient strength to permit handling during the electrical treatment after activation to improve the conductivity.

If no such improvement is desired, crosslinking may be carried further at this point.

Subsequent immersion in aqueous NaOH, HCl solution—and optionally NaCl solution to neutralize the NaOH and HCl treated material—results in hydrolyzation and activation.

The cationic and anionic constituents are now bound together and form an amphoteric physical structure ready for treatment by electric current previously described herein.

The physical strength of the treated or untreated material may be improved by post crosslinking.

The above mentioned AMF and Graydon patents disclose a considerable variety of cationogenic and anionogenic compounds. Other compounds may be produced by amination or quaternization of the ionogenic substances described by Graydon.

*Example 10.*—A cation membrane was prepared by casting a mixture of saturated aqueous solutions of 1 mol phenol sulfonic acid and 0.8 mol formaldehyde into the space between the electrodes and the rubber gasket of the apparatus of FIG. 11. The electrodes were then heated to 90° C. and an alternating current of 60 c. and 600 ma. per square cm. was passed through the membrane material which then gradually solidified by polymerization and crosslinking under the influence of the heated electrodes and the current.

After 24 hours the membrane was hard, the electrodes were cooled and the current was shut off. The membrane was removed and conditioned for test in aqueous 0.1 N. NaCl solution.

A comparison membrane was produced in the same manner except that no current was passed through the material.

Results:
Area resistance (ohms/cm.$^2$)
Treated membrane _____ 49
Comparison membrane _____ 94

*Comment.*—Crosslinking and polymerization occurred during the treatment which began during the liquid state of the material, i.e., above the yield point and continued until the material had hardened, i.e., reached a state below the yield point. As the start of the treatment is at a point above the yield point, in fact is commenced before a yield point may be said to exist because of the liquid condition of the material, any current density will produce a favorable result, though a stronger current has a more pronounced effect in the sense of keeping the pores open which during hardening of the material tend to close or become obstructed.

*Example 11.*—The apparatus of FIG. 4 was modified by arranging a second generator of 10,000 c. A.C. and a current regulator parallel to 26, 29.

Electrolyte: aqueous 1 N. NaCl solution. Temperatures: 60° C. in warm zone; 20° C. in cold zone. Current density: 60 c. A.C.; 200 ma. at both electrode pairs 24, 25 and 30, 31. Current density: 10,000 c. A.C. increased from zero at the rate of 5 ma./min./cm.$^2$. Test current set to 3 ma./cm.$^2$ by adjusting the voltage regulator 43. The high frequency current was increased until the test current registered 7 ma./cm.$^2$. The membrane rate of advance was set to produce 5 minutes of exposure of the membrane in the zone 23.

Results:

|  | Area resistance (ohms/cm.$^2$) | |
| --- | --- | --- |
|  | Before treatment | After treatment |
| "Amfion" cation membrane | 14 | 6 |

The same membrane was tested after grinding off the surface layer of the membrane to leave a core portion of one-half of the original membrane thickness.

After treatment
Area resistance (ohms/cm.$_2$) _____ 2

From this is deduced that the area resistances of the ground off skin portions is 4 ohms per cm.$^2$.

The cation transference number of the membrane at 0.57 N. mean concentration was:

Before treatment _____ 0.95
After treatment _____ 0.94

*Comment.*—The tests established that the resistivity of the membrane can be reduced to less than one-half of its original figure with only a very small sacrifice of selectivity.

The central or core portion of the membrane which assumes a higher temperature during treatment shows a disproportionate increase in conductivity. Thus the membrane may be considered as having a core portion of high conductivity and presumably relatively low selectivity and two surface layers of lower conductivity than the core portion, but of high selectivity resulting in a material overall improvement of the membrane characteristics.

*Example 12.*—A Graydon cation membrane was prepared from the following constituents:

40 parts (by weight) of propylester of styrene sulfonic acid
44.5 parts of styrene
15 parts of divinyl benzene
0.5 part of benzoyl peroxide The liquid mixture was cast in a mold and heated to produce a soft solid in completely crosslinked membrane. The membrane was then activated in aqueous 1 N. NaOH solution and thereafter equilibrated in aqueous 1 N. NaCl solution.

The moist membrane was then placed into the apparatus of FIG. 11 between the electrodes and the rubber seal. An electric current of 300 ma./cm.$^2$ 60 c. A.C. was passed through the membrane and the electrodes were simultaneously heated to 90° C. until the membrane was completely crosslinked, which occurred after about 12 hours. The membrane was then cooled, removed, equilibrated in aqueous 0.1 N. NaCl solution and tested.

Results:  Area resistance (ohms/cm.$^2$)
Membrane treated in apparatus with current ____ 16
Membrane treated in apparatus without current _____ 38

*Example 13.*—A membrane was prepared from a mixture of 2 parts (per volume) of nylon, 1 part of sulfonated polystyrene polymer in K form and 1 part of quaternized polystyrene in Cl form dissolved in sufficient formic acid to produce a highly viscous solution at 30° C. The solution was extended as a film into the space between the electrodes of the apparatus of FIG. 7 filled with a electrolyte of 0.1 N. KCl in water having a temperature of 20° C. The current density at all electrodes was 400 ma./cm.$^2$. Used electrolyte was continuously replaced by fresh electrolyte from a supply tank.

Contact of the film with the electrolyte causes the film to coalesce as formic acid is withdrawn from the film and a certain amount of water enters. The film was pressed slowly through the treatment zone to insure complete coagulation and hardening of the material, which took place within about 15 minutes.

Results:  Area resistance (ohms/cm.$^2$)
Coagulation without current _____ 42
Coagulation with current _____ 9

The resistance was measured in aqueous 0.1 N. NaCl solution.

*Comment.*—The two polymers may be in other forms such as H, Li, Na, etc. for the sulfonated constituent, and OH, F, etc. for the quaternized constituent.

*Example 14.*—An "Amfion" cation membrane was soaked in benzene to soften its polyethylene matrix and lower its yield point temporarily for the purpose of the treatment.

The treatment data were identical with those of Example 1a with the following results:

|  | Area resistance (ohms/cm.$^2$) | |
| --- | --- | --- |
|  | Untreated | Treated |
| "Amfion" cation membrane | 14 | 5 |

The test current of 12 ma./cm.$^2$ was reached at a lower temperature than in Example 1a as determined by touch, but the temperature was not measured.

The benzene was driven out of the membrane during treatment and the treated membrane appeared to be free from benzene.

*Example 15.*—An "Amfion" cation membrane was first treated according to the data of Example 1 modified by substituting an aqueous 4 N. KCl solution as electrolyte, the apparatus being pressurized at 8 kg./cm.$^2$. A current density of 500 ma./cm.$^2$ was maintained in the hot and in the cold treatment zone. The temperature was permitted to rise until the test current rose to 8 ma./cm.$^2$.

The treatment membrane was subsequently treated for a second time under 8 atm. pressure with an electrolyte of aqueous 0.2 N. LiCl solution at a current density of 500 ma./cm.$^2$ in the cold zone and 2000 ma./cm.$^2$ in the hot zone until the test current again rose to 8 ma./cm.$^2$.

The treated membrane was then tested and showed the following results:

|  | Area resistance (ohms/cm.²) | |
| --- | --- | --- |
|  | Untreated | Treated |
| "Amfion" cation membrane | 14 | 3.5 |

The membrane surfaces were then ground to remove the surface layers, leaving the central ⅔ of the membrane intact. The area resistance of the central portion was 1 ohm/cm.².

The cation transfer number changed under the treatment from 0.95 to 0.94.

*Comment.*—The first treatment produced a low temperature gradient in the membrane and affected the entire body of the membrane substantially uniformly, producing a membrane of small pore size and correspondingly good selectively.

The second treatment produced a substantial temperature gradient in the membrane by reason of the heating of the innermost portion of the membrane to a high temperature well above the yield point. The surface remained cool due to the cooling action of the contacting electrolyte.

The treated membrane has a central layer of high conductivity, but reduced selectivity and outer layers of high selectivity but lower conductivity.

The overall improvement of the membrane by the treatment is considerable.

During some tests a dark sludge was deposited on the platinum electrodes. This deposition was particularly pronounced in treating "Amfion" membranes.

Organic matter was apparently contained within the membrane pores and mechanically held therein until driven out by the treatment current. The deposit was not analyzed.

What is claimed is:

1. The method of producing a permanent increase in electrical conductivity in a sheet of ion exchange material composed predominantly of synthetic resin, the method comprising, passing an electric current substantially transversely through the membrane material by electrolytic conductance while the synthetic resin material is in a condition above its yield point in relation to the magnitude of the electric current being passed therethrough.

2. Method of producing a permanent increase in electrical conductivity in an ion exchange membrane comprising a synthetic resin matrix, the method comprising, passing an electric current substantially transversely through the membrane material by electrolytic conductance under a temperature/electric current condition beyond the yield point of the membrane material.

3. The method of claim 2 carried out while the membrane is immersed in an ionic liquid through which the electric current passes.

4. Method of producing a permanent increase in electrical conductivity in an ion exchange membrane composed of heat softenable synthetic resin, the method comprising, immersing the membrane in an ionic liquid and passing an electric current substantially transversely through the membrane under a temperature/electric current condition beyond the yield point of the membrane material while maintaining a condition substantially preventive of the absorption of liquid by the membrane.

5. Method of producing a permanent increase in electrical conductivity in an ion exchange membrane composed of heat softenable synthetic resin, the method comprising, immersing the membrane in an ionic liquid of a total ion content/cm.³ greater than the total mobile ion content/cm.³ of the membrane material; and passing an electric current substantially transversely through the membrane under a temperature/electric current condition beyond the yield point of the membrane material.

6. The method as set forth in claim 5 in which the ratio of ions of one polarity to solvent in the liquid is greater than the ratio of mobile ions to solvent in the membrane material.

7. A method of producing a permanent increase in electrical conductivity in an ion exchange membrane composed of heat softenable synthetic resin, the method comprising, passing an electric current through the membrane material by electrolytic conductance under a temperature/electric current condition beyond the yield point of the membrane material, and then cooling the membrane material to a temperature below the yield point while maintaining passage of an electric current through the membrane.

8. Method of producing a permanent increase in electrical conductivity in an ion exchange membrane comprising a synthetic resin matrix, the method comprising, immersing the membrane in an ionic liquid, passing an electric current substantially transversely through the membrane under a condition beyond the yield point of the membrane material in relation to the electric current being passed therethrough; and then crosslinking the membrane material.

9. The method as set forth in claim 8 in which a flow of an electric current across the membrane is maintained during crosslinking.

10. Method of producing a permanent increase in electrical conductivity in an ion exchange membrane comprising a synthetic resin matrix, the method comprising, immersing the membrane in an ionic liquid; and passing an electric alternating current substantially transversely through the membrane under a condition beyond the yield point of the membrane material in relation to the magnitude of the electric current being passed therethrough.

11. Method of producing a permanent increase in electrical conductivity in an ion exchange membrane comprising a synthetic resin matrix, the method comprising, immersing the membrane in an ionic liquid; and passing an electric alternating current substantially transversely through the membrane under a temperature/electric current condition beyond the yield point of the membrane material.

12. Method of producing a permanent increase in electrical conductivity in an ion exchange membrane comprising a synthetic resin matrix, the method comprising, immersing the membrane in an ionic liquid; passing an electric alternating current substantially transversely through the membrane under a temperature/electric current condition beyond the yield point of the membrane material; and then cooling the membrane material to a temperature below the yield point while maintaining passage of an electric current through the membrane.

13. In the method of producing a high conductivity membrane of synthetic resinous ion exchange material which method involves the transition of the membrane material from a first state in which the material is soft, said first state being characterized by at least one of the following physical characteristics: (1a) a certain temperature, (1b) a certain low degree of crosslinking including zero crosslinking, (1c) low physical strength, (1d) a certain degree of polymerization, and (1e) a certain solvent content of a solvent of the matrix material, to a subsequent second state in which the material is hard, said second state being characterized by at least one of the following characteristics: (2a) a lower temperature than 1a, (2b) a higher degree of crosslinking than 1b, (2c) greater physical strength than 1c, (2d) a higher degree of polymerization than 1d, and (2e) a lower solvent content than 1e; the step of passing an electric current transversely through the membrane material by electrolytic conductance during at least a portion of the transition stage, the step being carried out at a current density sufficient to place the material beyond its yield point, and maintaining said current density until said yield point is reached.

14. In the method of producing a high conductivity membrane of synthetic resinous ion exchange material which method involves the transition of the membrane material from a first state in which the material is soft, said first state being characterized by at least one of the following physical characteristics: (1a) a certain temperature, (1b) a certain low degree of crosslinking including zero crosslinking, (1c) low physical strength, (1d) a certain degree of polymerization, and (1e) a certain solvent content of a solvent of the matrix material, to a subsequent second state in which the material is hard, said second state being characterized by at least one of the following characteristics: (2a) a lower temperature than 1a, (2b) a higher degree of crosslinking than 1b, (2c) greater physical strength than 1c, (2d) a higher degree of polymerization than 1d, and (2e) a lower solvent content than 1e; the step of passing an electric current transversely through the membrane material by electrolytic conductance during at least a portion of the transition stage under a condition of temperature and current density under which the material is beyond its yield point.

15. In the method of producing a high conductivity membrane of synthetic resinous ion exchange material which method involves the transition of the membrane material from a first state in which the material is soft, said first state being characterized by at least one of the following physical characteristics: (1a) a certain temperature, (1b) a certain low degree of crosslinking including zero crosslinking, (1c) low physical strength, (1d) a certain degree of polymerization, and (1e) a certain solvent content of a solvent of the matrix material, to a subsequent second state in which the material is hard, said second state being characterized by at least one of the following characteristics: (2a) a lower temperature than 1a, (2b) a higher degree of crosslinking than 1b, (2c) greater physical strength than 1c, (2d) a higher degree of polymerization than 1d, and (2e) a lower solvent content than 1e; the step of passing an alternating electric current transversely through the membrane material by electrolytic conductance during at least a portion of the transition stage under a condition of temperature and current density under which the material is beyond its yield point.

16. In the method of producing a high conductivity membrane of synthetic resinous ion exchange material which method involves the transition of the membrane material from a first state in which the material is soft, said first state being characterized by at least one of the following physical characteristics: (1a) a certain temperature, (1b) a certain low degree of crosslinking including zero crosslinking, (1c) low physical strength, (1d) a certain degree of polymerization, to a subsequent second state in which the material is hard, said second state being characterized by at least one of the following characteristics: (2a) a lower temperature than 1a, (2b) a higher degree of crosslinking than 1b, (2c) greater physical strength than 1c, (2d) a higher degree of polymerization than 1d; the steps of passing an electric current through the membrane material by electrolytic conductance during at least a portion of the transition stage and at a current density sufficient to place the material beyond its yield point, and maintaining said electric current until said yield point is reached; and crosslinking the material to a higher degree while still maintaining passage of electric current therethrough.

17. In the method of producing a high conductivity membrane of synthetic crosslinkable resinous ion exchange material, involving the step of crosslinking which converts the material from a soft to a hardened state, the step which comprises passing an electric current transversely through the membrane material by electrolytic conductance while the material is still in a soft state in which the degree of crosslinking is low, including zero, the step being carried out under a temperature/electric current density condition above the yield point of the material; and crosslinking the material to a higher degree to harden it subsequent to the critical application of the electric current.

18. In the method of producing a high conductivity membrane of synthetic crosslinkable resinous ion exchange material, involving the step of crosslinking which converts the material from a soft to a hardened state, the step which comprises passing an electric current transversely through the membrane material by electrolytic conductance while the material is still in a soft state in which the degree of crosslinking is low, including zero, the step being carried out under a temperature/electric current density condition above the yield point of the material; and crosslinking the material to a higher degree to harden it sufficiently to arrive at a point below the yield point, the last recited step of crosslinking being carried out subsequent to the initial application of the electric current.

19. The method of treating a body composed of a synthetic resinous ion exchange material for the purpose of increasing its electrical conductivity in a certain direction, which comprises placing the body in a condition in which the body contains a certain amount of resin matrix softening solvent between electrodes in the presence of an electrolyte and applying an electrical potential to the electrodes, the electrodes being so placed as to cause a current to flow from one to the other through the electrolyte and said body in said direction, the potential being sufficiently great and maintaining said potential until the yield point is reached to produce a substantially immediate change in resistivity of said body, passage of the yield point being ascertainable by an increase in a test current, the test current being produced by applying a constant test potential across said body in said direction between test electrodes positioned on opposite sides of the body, and then removing solvent from said body to harden it.

20. The method of treating a body composed of a synthetic resinous ion exchange material for the purpose of increasing its electrical conductivity in a certain direction, which comprises placing the body in a condition in which the body contains a certain amount of resin matrix softening solvent between electrodes in the presence of an electrolyte and applying an electrical potential of sufficient magnitude to the electrodes for the material to exceed its yield point, and maintaining said potential at least until the yield point is reached, the electrodes being so placed as to cause a current to flow from one to the other through the electrolyte and said body in said direction; and then removing solvent from said body to harden it while current is passing through said body.

21. The method of treating a body composed of a synthetic resinous ion exchange material for the purpose of increasing its electrical conductivity in a certain direction, which comprises placing the body in electrically conductive relation between electrodes in the presence of an electrolyte and applying an electrical potential to the electrodes, the electrodes being so placed as to cause a current to flow from one to the other through the electrolyte and said body in said direction, the potential being sufficiently great for the material to exceed its yield point, and maintaining said potential at least until the yield point is reached to produce a substantially immediate change in resistivity of said body, passage of the yield point being ascertainable by an increase in a test current, the test current being produced by applying a constant test potential across said body in said direction between test electrodes positioned on opposite sides of the body.

22. The method of treating a body composed of a synthetic resinous ion exchange material for the purpose of increasing its electrical conductivity in a certain direction, which comprises placing the body in electrically conductive relation between electrodes in the presence of an electrolyte and applying an electrical potential to the electrodes, the electrodes being so placed as to cause a current to flow from one to the other through the electrolyte and said body in said direction, the potential being sufficiently great and the temperature of the body being sufficiently high in relation to the potential for the material to exceed its yield point and maintaining said temperature and potential until the yield point is reached to produce a substantially immediate change in resistivity of said body, passage of the yield point being ascertainable by an increase in a test current, the test current being produced by applying a constant test potential across said body in said direction between test electrodes positioned on opposite sides of the body.

23. The method of directionally modifying the electrical conductivity of a body of ion exchange material in the direction of one axis in preference to the conductivity measured in the direction of another axis at an angle to said one axis, the method comprising, passing solvated ions by electrolytic force through said body in the direction of said one axis while said material is in a soft yielding state above its yield point, and subsequently hardening said material while continuing said passage of solvated ions at least until the material has hardened.

24. Method of producing a permanent increase in electrical conductivity in an ion exchange membrane comprising a synthetic resin matrix containing a certain amount of a matrix softening solvent, the method comprising, immersing the membrane in an ionic liquid; and passing an electric current substantially transversely through the membrane under a condition beyond the yield point of the membrane material in relation to the magnitude of the electric current being passed therethrough; and removing solvent while current is passing through said membrane.

25. The method of modifying the electrical conductivity of a body of resinous ion exchange material which comprises passing solvated ions by electrolytic force through said body while said material is in a soft yielding state above its yield point; and then hardening said material while continuing passing of said ions through said body at least until the material has hardened.

References Cited by the Examiner
UNITED STATES PATENTS

| | | | |
|---|---|---|---|
| 2,600,107 | 6/52 | Gelfand et al. | 204—131 |
| 2,763,607 | 9/56 | Stoverman | 204—131 |
| 2,788,319 | 4/57 | Pearson | 204—131 |
| 2,824,831 | 2/58 | Conwell et al. | 204—131 |
| 2,858,264 | 10/58 | De Jong | 204—296 |
| 2,903,406 | 9/59 | Miller | 204—296 |

FOREIGN PATENTS 851,584  10/60  Great Britain.

JOHN H. MACK, *Primary Examiner.*

JOHN R. SPECK, MURRAY TILLMAN, *Examiners.*